United States Patent [19]
Saka et al.

[11] Patent Number: 5,557,772
[45] Date of Patent: Sep. 17, 1996

[54] DATA PROCESSING APPARATUS INCLUDING A REGISTER STORING A PARAMETER AND A MICROINSTRUCTION EXECUTION ARRANGEMENT INCLUDING A CORRECTION ARRANGEMENT FOR CAUSING A FIRST VALUE OF THE PARAMETER TO BE CHANGE TO A SECOND, CORRECT VALUE

[75] Inventors: Yoshiaki Saka, Chiba; Toshiharu Ohshima, Kawasaki, both of Japan

[73] Assignee: Fujitsu Limited, Kawasaki, Japan

[21] Appl. No.: 219,753

[22] Filed: Mar. 29, 1994

Related U.S. Application Data

[63] Continuation of Ser. No. 583,550, Sep. 17, 1990, abandoned.

[30] Foreign Application Priority Data

Sep. 19, 1989 [JP] Japan ................. 1-242671

[51] Int. Cl.⁶ ................. G06F 9/26; G06F 9/38
[52] U.S. Cl. ................. 395/496; 395/467; 395/464; 395/375; 364/DIG. 1; 364/DIG. 2
[58] Field of Search ................. 395/800, 575, 395/775, 725, 700, 400, 425, 250, 275, 375, 421.03, 182.14, 182.04, 182.05, 435, 183.13, 182.13, 182.18, 182.02, 483, 496, 200.06; 364/DIG. 1, DIG. 2, 716; 371/12, 10.1, 10.2, 11.3, 13, 16.5, 31, 37.5, 27

[56] References Cited

U.S. PATENT DOCUMENTS

| | | | |
|---|---|---|---|
| 4,484,303 | 11/1984 | Provanzano et al. | 395/275 |
| 4,562,537 | 12/1985 | Barnett et al. | 395/375 |
| 4,637,021 | 1/1987 | Shenton | 371/37.5 |
| 4,654,786 | 3/1987 | Cochran et al. | 395/375 |
| 4,665,500 | 5/1987 | Poland | 364/760 |
| 4,763,253 | 8/1988 | Bluhm et al. | 395/375 |
| 4,783,783 | 11/1988 | Nagai et al. | 395/775 |
| 4,841,439 | 6/1989 | Nishikawa et al. | 395/575 |
| 5,113,522 | 5/1992 | Dinwiddie, Jr. et al. | 395/700 |

OTHER PUBLICATIONS

S. Mishra, "The VAX 8800 Microarchitecture" pp. 322–327 Feb. 23, 1987, 32nd IEEE Computer Society International Conference; San Francisco.

Primary Examiner—Daniel H. Pan
Attorney, Agent, or Firm—Armstrong, Westerman, Hattori, McLeland & Naughton

[57] ABSTRACT

A microinstruction memory stores microinstructions, and a microinstruction execution unit executes a selected one of the microinstructions by a pipeline process and outputs an operation result. The microinstructions include a specific microinstruction. The data processing apparatus also includes a correction part which has the microinstruction execution unit execute the specific microinstruction when a predetermined event occurs so that the parameter is changed to a corrected parameter which corresponds to a parameter used in an immediately previous pipeline process. The microinstruction execution unit stops operating when the predetermined event occurs and starts the operation again by using the corrected parameter.

19 Claims, 7 Drawing Sheets

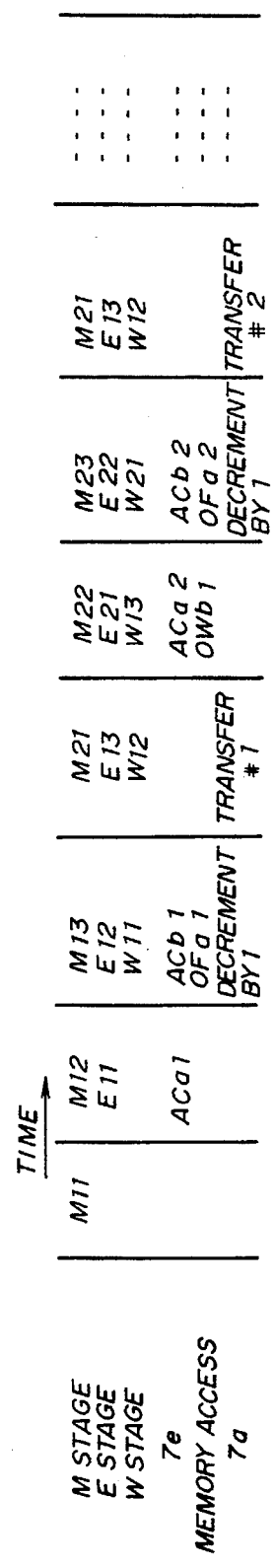
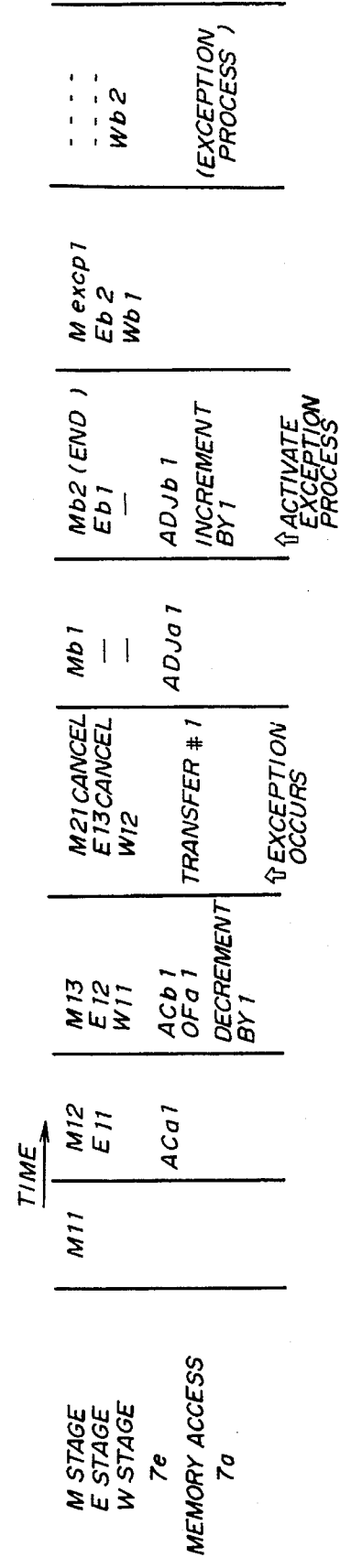

DATA PROCESSING APPARATUS INCLUDING A REGISTER STORING A PARAMETER AND A MICROINSTRUCTION EXECUTION ARRANGEMENT INCLUDING A CORRECTION ARRANGEMENT FOR CAUSING A FIRST VALUE OF THE PARAMETER TO BE CHANGE TO A SECOND, CORRECT VALUE

This application is a continuation of application Ser. No. 07/583,550 filed Sept. 17, 1990, now abandoned.

BACKGROUND OF THE INVENTION

The present invention generally relates to a data processing apparatus, and more particularly, to a microprogram control type data processing apparatus.

There is known a microprogram control in which microinstructions or micro-orders are stored in a memory and a series of microinstructions necessary to execute an instruction is sequentially read out. A microinstruction is obtained by dividing a procedure of a structural element, such as a storage unit or an operation unit, with respect to one instruction (macro operation) executed by a processor or computer (a machine language instruction or microinstruction) into basic procedures (micro operation). According to a microprogram control, it is possible to design a logic part of the data processing apparatus even when the details of the specification of an architecture are not yet determined and thus reduce the time it takes to design the data processing apparatus. Information about a series of microinstructions which are to be executed is stored in the form of a firmware. Thus, it is possible to flexibly carry out a modification and/or addition of processing. For the above-mentioned reasons, a microprogram control is being widely used.

A conventional microprogram control has an advanced instruction which defines a series of procedures which are to be executed in response to one instruction. Typical examples of such an advanced instruction are a string move instruction and a string search instruction. The string move instruction is used when a data string stored in a memory area is transferred to another memory area. The string search instruction is used when data in a memory is searched to identify a desired data string.

It will be noted that it takes a long time to execute an advanced instruction. This prevents real-time data processing. From this point of view, if an interrupt or an exception processing request occurs while an advanced instruction is being executed, the execution of the advanced instruction is temporarily stopped and the interrupt or exception processing request is executed. In order to temporarily stop the execution of the advanced instruction such as the string move instruction or string search instruction, it is necessary to save parameter information in memory areas or registers until the stopped execution is started again. For example, it is necessary to save a memory address of a transfer source (source memory address), a memory address of a transfer destination (destination memory address), and the number of times that data is transferred, when the execution of the string move instruction is temporarily stopped.

Conventionally, parameter information is renewed when one processing unit is completed without having errors. For example, in a conventional string move instruction, when one processing unit is completed without having an error, that is, when data is read out from a memory area and then written into another memory area without having an error, parameter information about the source memory address, the destination memory address and the number of times that data is transferred is renewed. With this arrangement, if an error occurs while data is being read out, parameter information itself obtained at this time is saved.

However, conventional microprogram controls such as the above-mentioned microprogram control present the following disadvantages. Parameter information is not renewed until one processing unit is completed. This is not suitable for a pipeline process in which a memory is being accessed while an address is calculated to obtain the next memory access procedure. In addition, it takes a considerably long time to save parameter information in corresponding registers if it is necessary to use a large amount of parameter information. As a result, it takes a long time to accept and start an interrupt or exception processing request.

One may consider the use of backup registers for use in backup of parameter information and/or temporary registers for storing parameter information which is being renewed. In this case, the contents of the temporary registers are transferred to the backup registers at once. However, this requires a large amount of hardware.

SUMMARY OF THE INVENTION

It is a general object of the present invention to provide an improved data processing apparatus in which the aforementioned disadvantages are eliminated.

A more specific object of the present invention to provide a data processing apparatus capable of executing an interrupt or exception processing request at a higher speed without increasing the amount of hardware.

The above-mentioned objects of the present invention are achieved by a data processing apparatus comprising: memory means for storing microinstructions; microinstruction executing means, coupled to the memory means, for executing a selected one of the microinstructions by a pipeline process and for outputting an operation result, said executing means including register means for storing a parameter, and the microinstructions including a specific microinstruction; correction means for having the microinstruction executing means execute the specific microinstruction when a predetermined event occurs so that the parameter is changed to a corrected parameter which corresponds to a parameter used in an immediately previous pipeline process. The microinstruction executing device stops operating when the predetermined event occurs and starts the operation again by using the corrected parameter.

The aforementioned objects of the present invention are also achieved by a data processing apparatus comprising: a first memory device for storing microinstructions; microinstruction executing device, coupled to the first memory device, for executing a selected one of the microinstructions by a pipeline process while renewing a parameter necessary to execute the selected one of the microinstructions and for outputting an operation result, the microinstructions including a specific microinstruction; and a second memory device for storing data. The data processing apparatus also comprises: an address generating device for generating an address which is to be output to the first memory device, one of the microinstructions corresponding to the address being read out from the first memory device and output, as the selected one of the microinstructions, to the microinstruction executing device; memory management device, coupled to the microinstruction executing device and the second memory device, for reading out data from the second memory device by referring to the parameter and for writing data into the second memory device by referring to the parameter; and an accepting device for accepting one of predetermined interruption and exceptions and for outputting a specific address indicating the specific microinstruction. The data processing apparatus further comprises a selecting device, coupled to the address generating device and the accepting device, for selecting either the address generated by the address generating device or the specific address output by the accepting device; and correction device, coupled to the selecting device, for having the microinstruction executing device execute the specific microinstruction in response to the specific address so that the parameter is changed to a corrected parameter which corresponds to a parameter used in an immediately previous pipeline process. The microinstruction executing device stops operating when the selecting device selects the specific address and starts the operation again by using the corrected parameter.

BRIEF DESCRIPTION OF THE DRAWINGS

Other objects, features and advantages of the present invention will become more apparent from the following detailed description when read in conjunction with the accompanying drawings, in which:

FIGS.4 and 5 are timing charts illustrating the operation of the data processing apparatus shown in FIGS. 1, 2 and 3;

DESCRIPTION OF THE PREFERRED EMBODIMENTS

Figure 1:
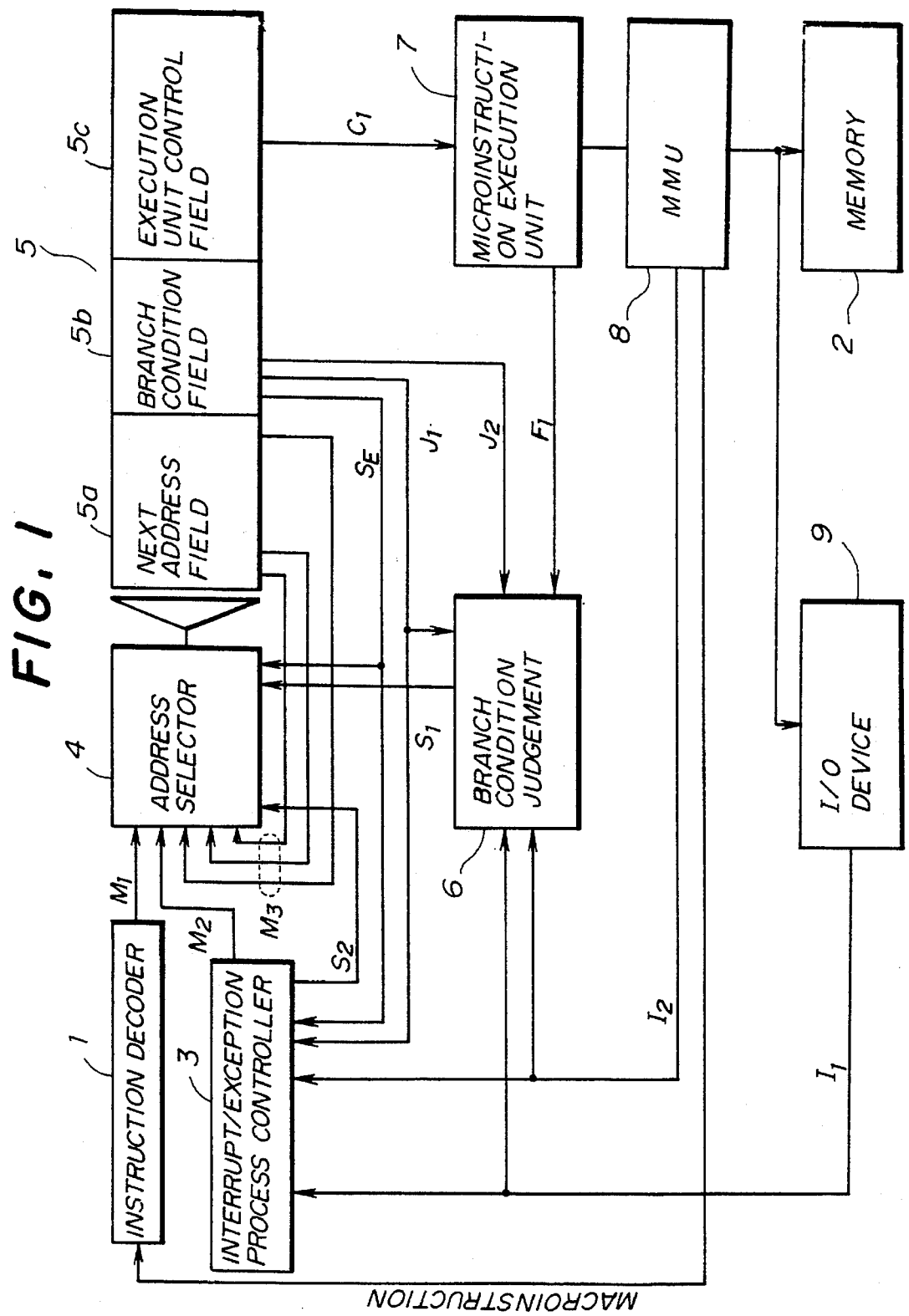
FIG. 1 is a block diagram illustrating the outline of a data processing apparatus according to a first preferred/embodiment of the present invention.

Referring to FIG. 1, there is illustrated the outline of a data processing apparatus according to a first preferred embodiment of the present invention. The data processing apparatus shown in FIG.1 is composed of an instruction decoder 1, a memory 2, an interrupt/exception controller 3, an address selector 4, a microinstruction memory 5, a branch judgment unit 6, a microinstruction execution unit 7, a memory management unit (MMU) 8 and an input/output (I/O) device 9.

The instruction decoder 1 decodes an instruction read out from the memory 2 under the control of the memory management unit 8 and generates a starting address $M_1$ of a microinstruction necessary to execute the readout instruction. Hereinafter, an instruction read out from the memory management unit 8 is referred to as a macroinstruction in order to distinguish the same from a microinstruction. The interrupt/exception controller 3 judges the priority order of interrupt/exception process request signals $I_1, I_2, \ldots$ and generates a starting address $M_2$ of an interrupt/exception accepting microinstruction corresponding to the interrupt/exception request having the highest priority. In addition, the interrupt/exception controller 3 generates a signal $S_2$, which causes the address selector 4 to select the starting address $M_2$ if a signal $J_1$ which will be described later is not ON. The address selector 4 selects one of the starting addresses $M_1$ and $M_2$, and next microaddress $M_3$ (a sets of plural microaddresses), and outputs the selected microaddress to the microinstruction memory 5.

The microinstruction memory 5 stores a plurality of microinstructions. Each of the microinstructions is composed of a next address field 5a, a branch condition field 5b and an execution control field 5c. The microinstruction memory 5 generates signals $C_1, J_1, J_2, S_E$ and $M_3$. The signal C1 is called an execution unit control signal, which controls the microinstruction execution unit 7, as will be described later. The signals $J_1$ and $J_2$ are called branch condition specifying signals, which specify a branch condition of a microinstruction. The signal $S_E$ is called an end specifying signal, which is supplied from the branch condition field 5b and which indicates the end of a micro processing routine. The signals $M_3$ are a plurality of microaddresses, which show whether or not a branch condition is satisfied or shows which one of the given branch conditions is satisfied.

The branch judgment unit 6 judges whether or not the branch condition is satisfied on the basis of the branch condition specifying signals $J_1$ and $J_2$ as well as a status signal $F_1$ which is supplied from the microinstruction execution unit 7, and outputs a control signal $S_1$ showing the judgment result.

The memory management unit 8 controls access procedures for accessing the memory 2 and external units such as the I/O unit 9, such as an address translation procedure based on a virtual memory process. The memory management unit 8 generates the exception process request signal $I_2$ which informs that an address translation exception occurs or that an exception arising from an access error such as a bus error occurs. The I/O unit 9 generates the interrupt request signal $I_1$ when an interrupt is requested.

The address selector 4 successively selects the starting address $M_1$ of each microinstruction generated and output by the instruction decoder 1 when the above each microinstruction consists of one step. On the other hand, when a microinstruction routine consists of a plurality of steps, the address selector 4 continuously selects the next address (or branch address) $M_3$ read out from the microinstruction memory 5. In response to the signal $S_2$, the address selector 4 always selects the starting address $M_2$ read out from the interrupt/exception controller 3, so that the instruction which is being executed is canceled without exception.

On the other hand, when the branch condition specifying signal $J_1$ showing that an interrupt or exception is a branch condition is ON, the branch judgment unit 6 checks the interrupt request signal $I_1$ supplied from the I/O device 9 and the exception process request signal $I_2$ from the main management unit 8. If one of the signals including $I_1$ and $I_2$ is active (ON), the branch judgment unit 6 selects a corresponding one of the next microaddresses M3 so that the procedure is jumped to a micro-branch address. If the branch condition based on the status signal $F_1$ is judged in addition to the above-mentioned judgment and both the branch conditions are satisfied, a micro-branch address is determined on the basis of a predetermined branch condition priority, which will be described later. When the branch condition specifying signal $J_1$ is ON, the data processing apparatus shown in FIG.1 operates in a way different from a normal interrupt/exception process. That is, the signal $S_2$ is masked (blocked) so as to prevent an instruction process being executed from being canceled, and the interrupt/exception process request is reserved. The reserved interrupt/exception process request is made effective when the signal $S_E$ is turned ON. At this time, the interrupt/exception controller 3 is released from the masked (blocked) state, and the starting address $M_2$ is selected by the address selector 4.

Figure 2:
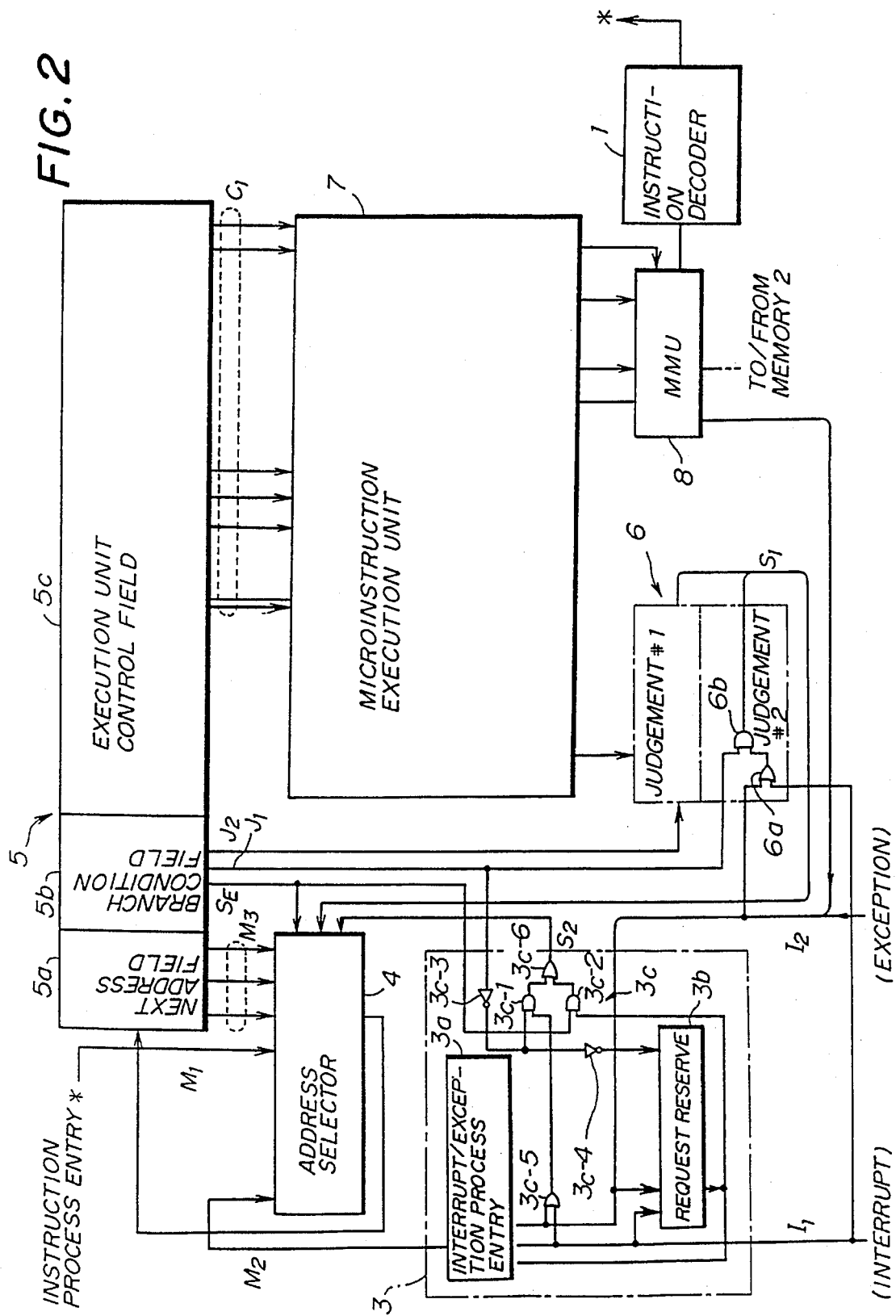
FIG. 2 is a more detailed block diagram illustrating the structure of the data processing apparatus shown in FIG. 1.

FIG.2 illustrates a detailed configuration of the data processing apparatus shown in FIG. 1. The interrupt/exception controller 3 is composed of an interrupt/exception process entry circuit 3a, a request reserving circuit 3b and a signal generator 3c. The signal generator 3c is composed of AND gates 3c-1 and 3c-2, inverters 3c-3 and 3c-4, and OR gates 3c-5 and 3c-6.

The branch judgment unit 6 is composed of a judgment circuit #1 and a judgment circuit #2. The judgment circuit #2 is composed of an OR gate 6a and an AND gate 6b. The OR gate 6a receives the interrupt signal $I_1$ and the exception process request signal $I_2$. The AND gate 6b receives the signal $J_1$ and the output signal of the OR gate 6a, and outputs the signal $S_1$.

Figure 3:
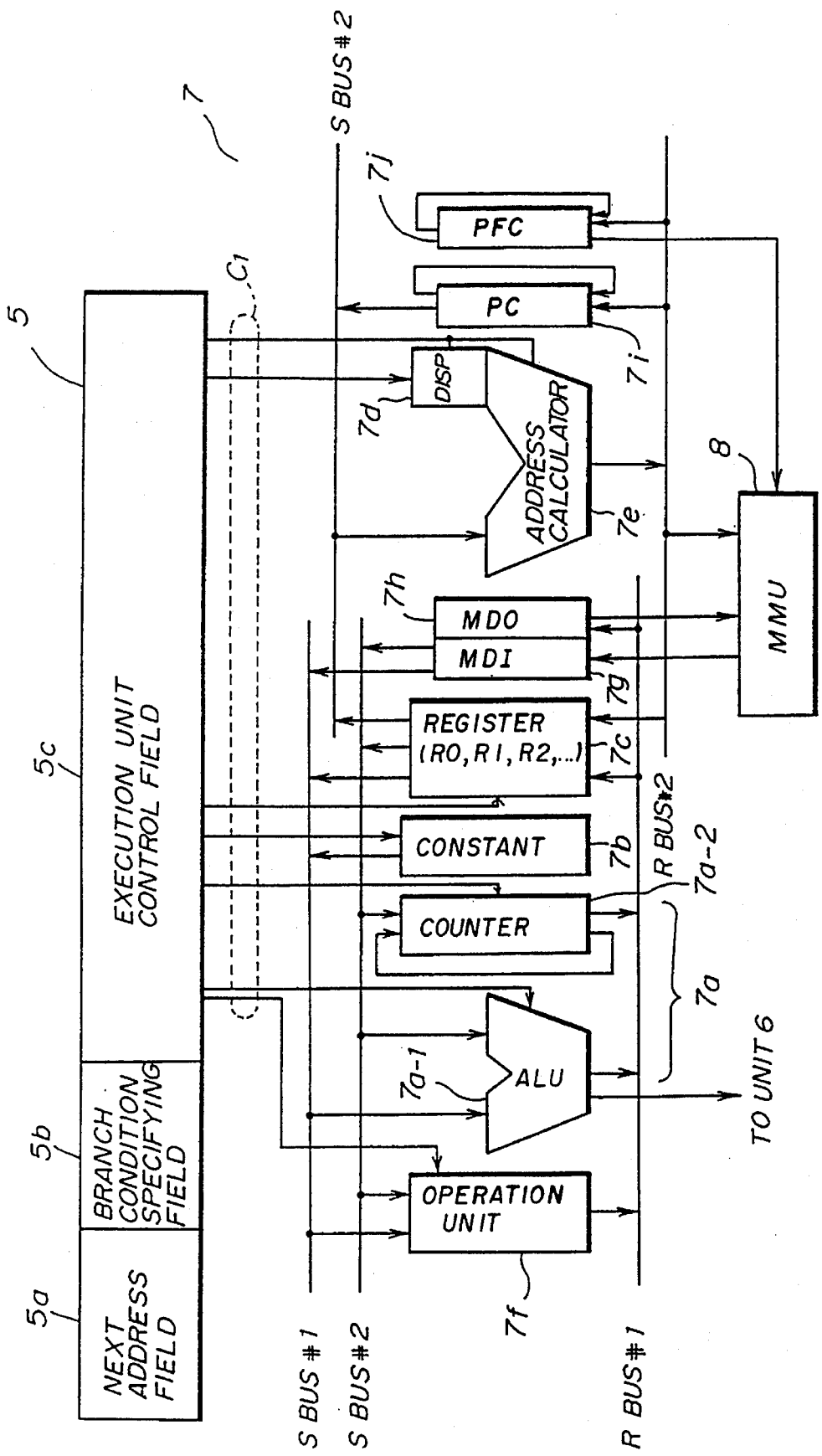
FIG.3 is a block diagram illustrating a configuration of a microinstruction execution unit shown in FIG. 2.

As shown in FIG. 3, the instruction execution circuit 7 is composed of an operation unit 7a, a constant generator 7b, a general purpose register 7c, a displacement generator 7d, an address calculator 7e, a group of operation units 7f other than the operation unit 7a, such as a shifter, an input data memory 7g, an output data memory 7h, a program counter 7i and a prefetch counter 7j. The operation unit 7a is composed of an arithmetic logic unit 7a-1 and a counter 7a-2. The general purpose register 7c has a register R0 provided for storing the source memory address, for example, in the string move instruction, a register R1 for storing the destination memory address, and a register R2 for storing the number of times that data is transferred.

The instruction execution circuit 7 has source (S) buses #1, #2 and #3 and result (R) buses #1 and #2. The above-mentioned structural elements of the instruction execution circuit 7 are connected to the S buses #1, #2 and #3 and the R buses #1 and #2, as shown in FIG. 3.

During a time when an instruction is being processed, if there is neither interrupt nor exception process request, the signals $I_1$ and $I_2$ are OFF (at a low level), and the signal $S_2$ is also OFF (at a low level). Thus, when a microinstruction consisting of a plurality of steps is executed, the selector 4 selects either the next or branch address $M_3$ in accordance with the signal $S_1$ generated and output by the branch judgment unit 6. Thus, the execution unit control signal $C_1$ corresponding to the selected address $M_3$ is read out from the microinstruction memory 5. In accordance with the readout instruction unit control signal $C_1$, the instruction execution unit 7 executes the following procedures. It will be noted that the following procedures related to the string move instruction.

First, the content of the register R0 in the general purpose register 7c is read out therefrom and transferred to the S bus #2. The readout content is added, by the address calculator 7e, to a displacement generated and output by the displacement generator 7d. The added result is transferred to the register R0 via the R bus #2, and written therein. In this way, the address of the source memory area in data transfer is renewed.

Second, the content of the register R1 in the general purpose register 7c is read out therefrom and then transferred to the S bus #2. The readout content is added, by the address calculator 7e, to the displacement. The added result is transferred to the register R1 via the R bus #2, and written therein. In this way, the address of the destination memory area is renewed.

Third, the content of the register R2 in the general purpose register 7c is read out therefrom and then transferred to the counter 7a-2 via the S bus #3. The content of the counter 7a-2 is decreased and the result is transferred to the register R2 via the R bus #1, and written therein. In this way, the content of the register R2 is renewed.

The source memory address and the destination memory address are sent, as information on the requested memory access, to the memory management unit 8.

The above-mentioned procedure is executed by a pipeline process which consists of three stages of a read (M) stage, an operation (E) stage and a write/branch condition judgment (W) stage.

FIG.4 illustrates a pipeline operation executed at the time of a normal process, and FIG. 5 illustrates a pipeline operation executed at the time of an exception process. According to the illustrated operations, the unit of data processing (processing unit) one processing unit consists of three cycles. At the read stage, a microinstruction is read out. At the operation stage, an operation is executed. At the write/branch condition judgment stage, the result of the operation executed at the operation stage is written and the branch condition judgment is carried out. Transfer #1 is carried out during three cycles $M_{11}$, $M_{12}$ and $M_{13}$, and transfer #2 is carried out during three cycles $M_{21}$, $M_{22}$ and $M_{23}$.

Symbol AC related to the address calculator 7e denotes the execution of an address calculation. More specifically, ACa1 and ACa2 denote address calculations necessary for reading data, and ACb1 and ACb2 denote address calculations necessary for writing data. Symbol OF related to the illustrated memory access procedure denotes the execution of data readout, and OW denotes the execution of data write. More specifically, OFa1 denotes the procedure for reading data in a memory area specified by ACa1, and OWb1 denotes the procedure for writing data into a memory area specified by ACb1.

In the normal process, the address necessary to read data, such as address ACa1, is calculated by the address calculator 7e. During the next cycle, data is read out from the memory 2 under the control of the memory management unit 8 (OFa1). During the next cycle, the readout data is transferred to the memory 2 (transfer #1). During the next cycle, the transferred data is written into the memory 2 (OWb1). During the above-mentioned data readout cycle, the number of times that data is transferred is renewed, that is, decremented by 1. When the number of times that data is transferred becomes zero, the execution of the string move instruction is completed.

Referring to FIG. 5, when an exception process request occurs, the read (M) stage and the operation (E) stage which are being executed at this time are canceled, that is, read stage $M_{21}$ and operation stage $E_{13}$ are canceled. During the next cycle labeled $M_{b1}$, a micro-branch corresponding to the exception process request is carried out. In the illustrated case, an address is calculated ($ADJ_{a1}$) in accordance with a corresponding microinstruction $M_{b1}$ during a cycle also labeled $M_{b1}$. In the same way, an address is calculated ($ADJ_{b1}$) in accordance with a corresponding microinstruction $M_{b2}$ during the next cycle also labeled $M_{b2}$ and the exception process is activated at stage $M_{b2}$. As shown in FIG. 5, stages $E_{b1}$ and $W_{b1}$ related to the microinstruction $M_{b1}$ are carried out, and stages $E_{b2}$ and $W_{b2}$ related to the microinstruction $M_{b2}$ are carried out.

It should be noted that the exception process request occurs during transfer #1 and thus transfer #1 is not completed. The current address of the source memory area and the current address of the destination memory area are related to transfer #1. When a transfer is started after the exception process is completed, the addresses of the source and destination memory areas are renewed. As a result, while transfer #1 is not completed, transfer #2 is started.

In order to overcome the above-mentioned disadvantage, the microinstructions $M_{b1}$ and $M_{b2}$ stored in branch destination memory areas of the microinstruction memory 5 are executed. The address calculation $ADJ_{a1}$ executed during the cycle $M_{b1}$ decrements the memory address of the transfer source by the size of data which is to be transferred during transfer #1. The address calculation $ADJ_{a2}$ executed during the cycle $M_{b2}$ decrements the memory address of the transfer destination by the size of data which is to be transferred during transfer #2. Further, 1 is added to the number of times that data is transferred, during the cycle $M_{b2}$. That is, when an exception process request occurs, a correction process is carried out in which the memory addresses of the transfer source and destination as well as the number of times that data is transferred are returned to those obtained in the immediately previous state. After the correction process is completed, a micro-routine $M_{excp1}$ related to the exception process request is started from a cycle labeled $M_{excp1}$, and a necessary exception process is executed. For example, a procedure for eliminating an error which occurs when the microinstruction execution unit 7 is executing a microinstruction. After the exception process is completed, the transfer process in the stopped state is started again by using the corrected parameters.

As has been described above, when an exception process request occurs while the advanced microinstruction, such as the string move instruction, is being executed, the stages being processed are canceled, and the corresponding microbranch is carried out during the next cycle. Then, in accordance with microinstructions $M_{b1}$ and $M_{b2}$ obtained by the micro-branch, the memory address of the transfer source, the memory address of the transfer destination and the number of times that data is transferred are reset to those obtained in the immediately previous state. After that, the microinstruction Mexcp1 of the exception request is activated. With this arrangement, it becomes possible to appropriately renew parameters for every cycle and thus carry out the renewal procedure and a prefetch procedure without taking into account the occurrence of an interrupt and an exception process request. As a result, it becomes possible to increase the data processing speed. Further, it is not necessary to provide for backup registers and a conventional micro-branch circuit can be used. Thus, there is no need for an increased amount of hardware. It will be noted that the prefetch procedure is carried out by using the prefetch counter 7j shown in FIG. 3.

Figure 6:
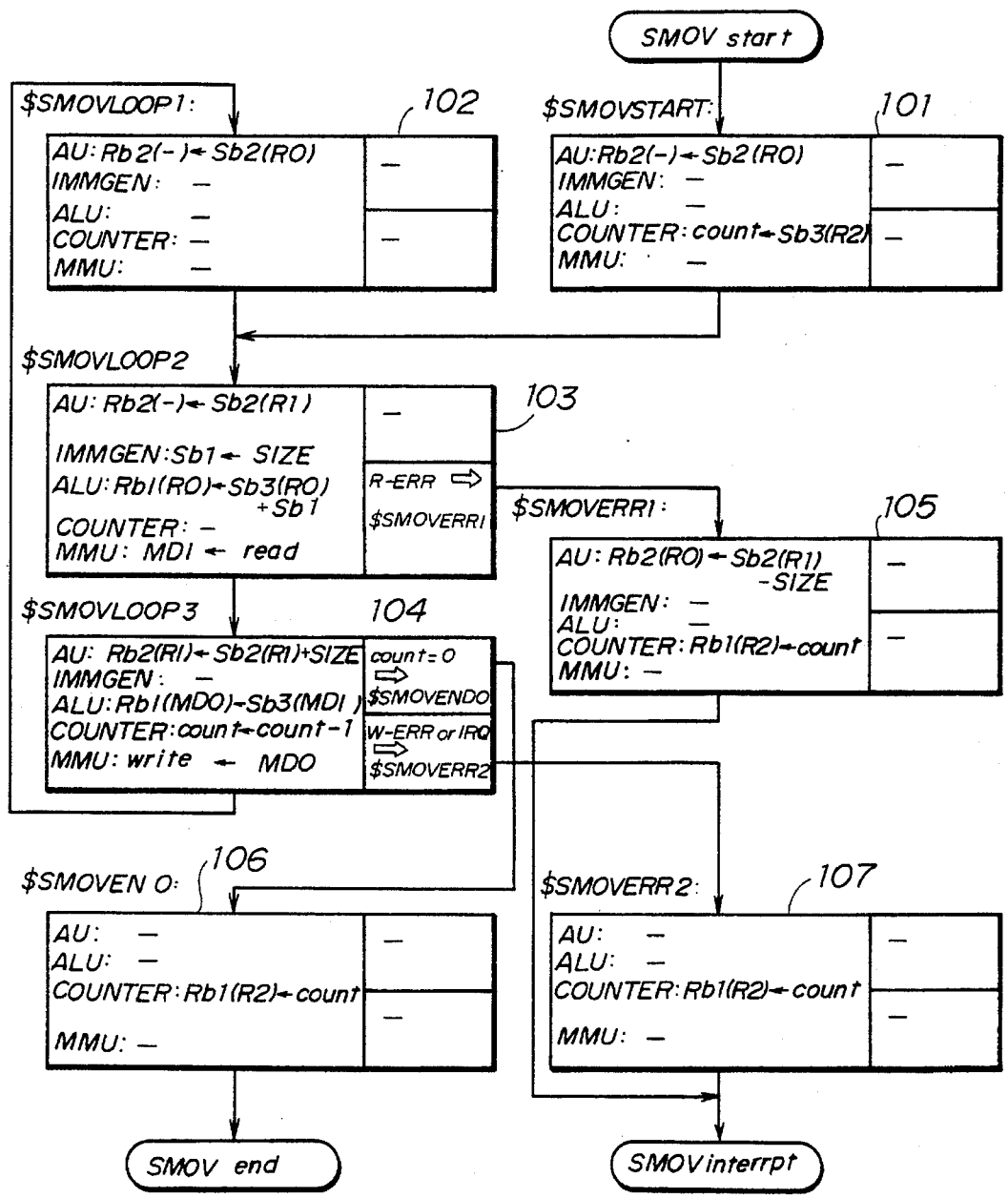
FIG.6 is a flowchart illustrating the operation of the data processing apparatus shown in FIGS. 1, 2 and 3.
Figure 7:
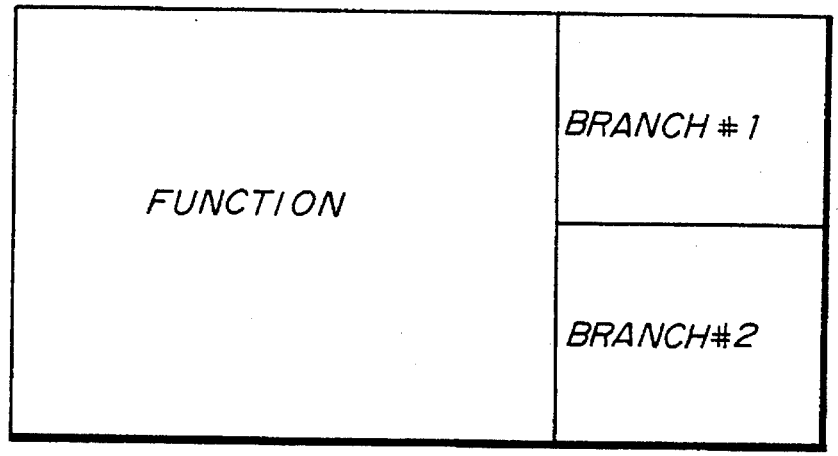
FIG.7 is a block diagram showing each block shown in FIG. 6.
Figure 8:
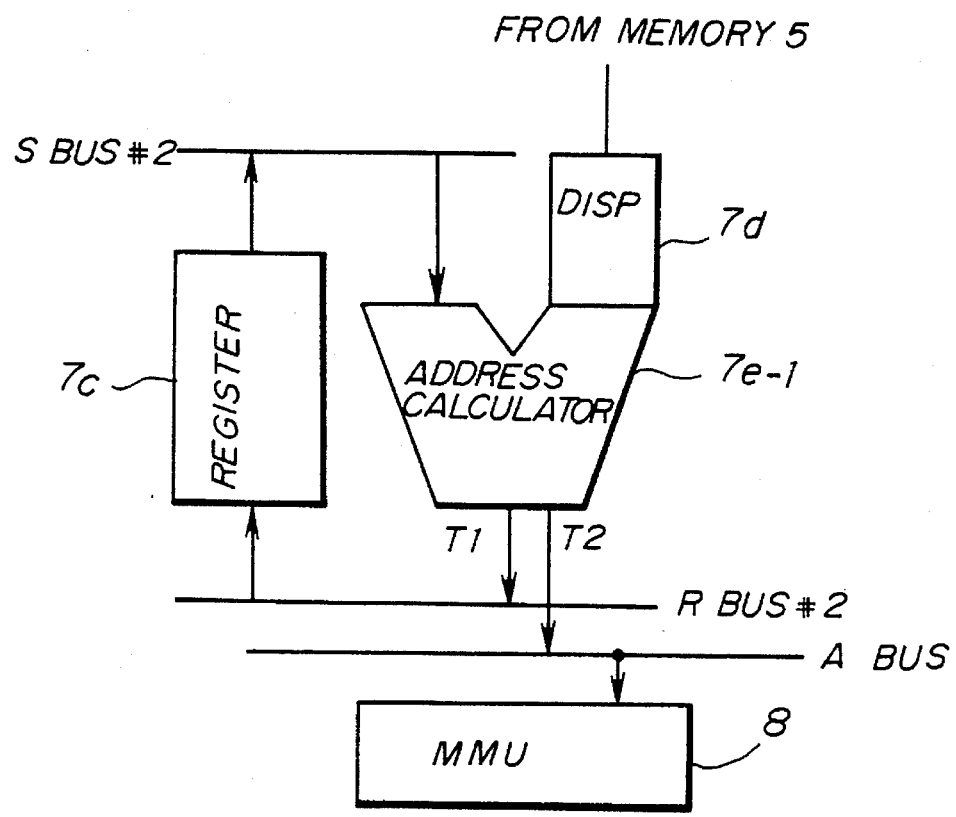
FIG.8 is a block diagram of an essential part of the structure of a data processing apparatus according to a second embodiment of the present invention.

A further description is given of the operation of the configurations shown in FIGS. 1, 2 and 3, with reference to FIGS. 6, 7 and 8. FIG. 6 is a flowchart illustrating the procedure of the string move (SMOV) instruction. In FIG. 6, R0, R1 and R2 denote the memory address of the transfer source (source memory address), the memory address of the transfer destination (destination memory address), and the number of times that data is transferred, respectively. It will be noted that registers formed in the general purpose register 7c shown in FIG. 3 are also identified by R0, R1 and R2. The source memory address R0 is renewed by the size of data to be transferred for every transfer, and the destination memory address R1 is renewed by the size of data to be transferred for every transfer. The size of data is one byte, two bytes or four bytes, for example, and specified by an instruction. The number of times that data is transferred is decremented by 1 for every transfer. Symbols Sb1, Sb2 and Sb3 denote the S buses #1, #2 and #3 shown in FIG. 3, respectively. Symbol Sb2(R0), for example, indicates data which is to be written into or read out from the aforementioned register R0 and output to the S bus #2. Rb1 and Rb2 denote the R buses #1 and #2 shown in FIG. 3, respectively. Symbol AU indicates the address calculator 7e shown in FIG. 3, and symbol IMMGEN indicates the constant generator 7b shown in FIG. 3. Symbol ALU indicates the ALU 7a-1 shown in FIG. 3, and symbol COUNTER indicates the counter 7a-2 shown therein. Symbol MMU indicates the memory management unit 8 shown in FIGS. 2 and 3.

FIG. 7 is a diagram illustrating a block corresponding to each step shown in FIG. 6. A function area of the block shown in FIG. 7 shows what operations are carried out. An area of the block labeled BRANCH #1 shows the operation of a normal branch process, and an area of the block labeled BRANCH #2 shows the operation of an interrupt/exception process request other than the normal branch process request.

At the commencement of the string move instruction, step 101 is carried out. At step 101, the address calculator 7e outputs data read out from the register R0 via the S bus #2 to the R bus #2, and data read out from the register R2 via the S bus #3 is written into the counter 7a-2. That is, the address calculator 7e calculates the source memory address. After step 101 is executed, step 103 is executed. It will be noted that a series of steps 102, 103 and 104 corresponds to one processing unit and that initially, step 101 is executed in place of step 102.

At step 103, the address calculator 7e calculates the destination memory address, and the data size is output to the S bus #1 from the constant generator 7b. Further, the ALU 7a-1 renews the source memory address by the data size. Moreover, the memory management unit 8 controls the memory 2 so that data specified at step 101 is read out therefrom and written into the data input register 7g shown in FIG. 3. If no error occurs during step 103, step 104 is executed. At step 104, the address calculator 7e renews the destination memory address by the data size, and the data in the data input register 7g is written into the data output register 7h via the S bus #1, the ALU 7a-1 and the R bus #1. Also, the count value in the counter 7a-2 is decremented by 1 and the write operation is carried out so that the data is read out from the data output register 7h and written into the memory 2. If there is no error during step 104, the procedure returns to step 102, at which step, the source memory address is calculated.

In the above-mentioned way, the series of steps 102, 103 and 104 is repeatedly carried out until the count value in the counter 7a-2 becomes zero. When the count value in the counter 7a-2 becomes zero, the procedure leaves the routine of steps 102, 103 and 104 and proceeds to step 106. At step 106, the count value in the counter 7a-2 (which is equal to zero in this case) is output to the R bus #1, and the string move instruction is over.

If an error labeled R-ERR at step 103, such as an address translation error or a page fault error, occurs while step 103 is being executed, step 105 is executed. At step 105, the address calculator 7e calculates the immediately previous source memory address by subtracting the data size supplied from the displacement generator 7d from the current address Sb(R1) supplied from the register R1 via the S bus #2. Further, count value in the counter 7a-2 is written into the register R2 via the R bus #1. After that, the string move instruction is interrupted.

If an error labeled W-ERR at step 104 or an interrupt occurs while step 104 is being executed, step 107 is executed. At step 107, the count value in the counter 7a-2 is written into the register R2 via the R bus #1. Conventionally, the data writing process is re-started in a way based on the type of processor. When a processor is designed to eliminate a cause of errors and retry the writing of data and to thereafter return the interrupted microinstruction, the data transfer (data write) is recognized to be successful even if an error occurs. Thus, it is unnecessary to correct the contents of the source and destination memory addresses. On the other hand, if a processor does not have the above-mentioned retry function is used, it is necessary to reset the contents of the registers R0, R1 and R2 to those in the immediately previous states because it is necessary to start the procedure from the data read.

A description will be given of a second preferred embodiment of the present invention with reference to FIGS. 8 and 9. Referring to FIG. 8, an address calculator 7e-1 used in the second embodiment of the present invention has first and second output terminals T1 and T2. The first output terminal T1 of the address calculator 7e-1 is connected to the R bus #2 and the second output terminal T2 is connected to an address (A) bus. On the other hand, according to the aforementioned first embodiment of the present invention, the R bus #2 functions as the address bus. The address calculator 7e-1 outputs, via the first output terminal T1, the result of an add operation between data on the S bus #2 and a displacement (data size) output by the displacement generator 7d. The address calculator 7e-1 also outputs, via the second output terminal T2, either data on the S bus #2 or the result of the addition operation between data on the S bus #2 and the displacement (data size) output by the displacement generator 7d. It can be seen from the above description that a memory address after renewed is output to the A bus, and a memory address before renewed is output to the R bus #2.

In the string move instruction processed in the first embodiment of the present invention, the source and destination memory addresses are renewed after an operand is accessed. During the operand access, the addresses themselves before they are renewed are used. On the other hand, since the address calculator 7e-1 has the first and second output terminals T1 and T2, the address calculation necessary for the operand access and the calculation necessary for the renewal procedure can be carried out at one time. In a system where data push or pop to a stack is carried out by using a stack pointer, one of the two stack pointer operations is carried out after the operand access.

Figure 9:
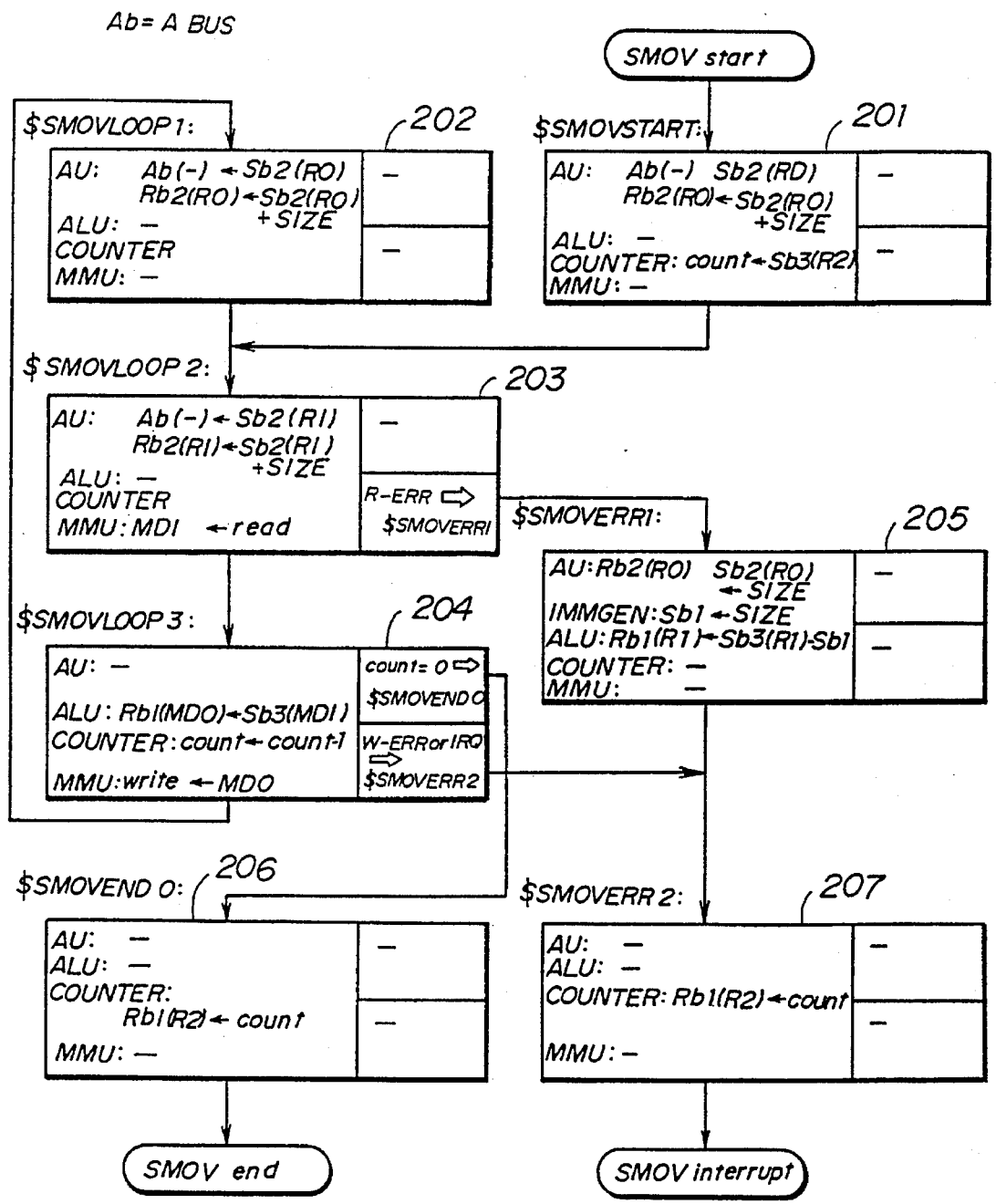
FIG.9 is a flowchart illustrating the operation of the data processing apparatus shown in FIG. 8.

Referring to FIG. 9, the source memory address is calculated so that the address calculator 7e-1 outputs the memory address Sb(R0) to the A bus via the second output terminal T2, and outputs the memory address [Sb(R0)+(data size)] (renewed source memory address) to the S bus #2 via the first output terminal T1. Data Sb3(R2) is written into the counter 7a-2 shown in FIG. 3. Then, step 203 is executed. At step 203, the destination memory address Sb(R1) is calculated so that the address calculator 7e-1 outputs the memory address Sb(R1) to the A bus via the second output terminal T2, and outputs the memory address [Sb(R1)+(data size)] (renewed destination memory address) to the S bus #2 via the first output terminal T1. At step 203, data is read out from the source memory area specified by the A bus and then written into the data input memory 7g (FIG. 3). If there is no error during step 203, step 204 is executed.

At step 204, the ALU 7a-1 passes through data read out from the data input memory 7g and writes the same into the data output memory 7h. At step 204, the count value in the counter 7a-2 is decremented by 1. If there is no error during step 204, step 202 is carried out. At step 202, the address calculator 7e-1 calculates the source address in the same way as step 202. When the count value in the counter 7a-2 becomes zero, step 206 is executed which is the same as step 106 shown in FIG. 6.

If an error occurs during step 203, step 205 is executed. At step 205, the address calculator 7e-1 calculates the source memory address in the immediately previous state by subtracting the data size from the address Sb(R0). The data size is written into the constant generator 7b. At step 205, the ALU 7a-1 calculates the destination memory address in the immediately previous state by subtracting the data size from the address Sb3(R1). Then, step 207 which is the same as step 107 shown in FIG. 6 is carried out.

The present invention is not limited to the specifically disclosed embodiments, and variations and modifications may be made without departing from the scope of the present invention.

What is claimed is:

1. A data processing apparatus comprising:

memory means for storing microinstructions including a specific microinstruction;

microinstruction executing means, coupled to said memory means, for executing a selected one of said microinstructions by a pipeline process and for outputting an operation result, said executing means including register means for storing a parameter having a first value; and microinstruction address generating means for generating an address of said specific microinstruction in said memory means when one of the microinstructions executed by said microinstruction executing means indicates that said specific microinstruction should be executed instead of a currently executed microinstruction if a predetermined event occurs: and control means for having said microinstruction executing means execute said specific microinstruction read from said memory means in response to the address of the specific microinstruction when said predetermined event occurs so that said first value of said parameter is changed to a second, corrected value which should be replaced by said first value of said parameter used in an immediately previous pipeline process;

wherein said microinstruction executing means executes said currently-executed microinstruction again using said second, corrected value of said parameter after said second, corrected value is obtained by said correction means.

2. A data processing apparatus as claimed in claim 1, further comprising data memory means for storing data;

wherein said parameter includes an address of a source memory area in said memory means, and data is read out from said source memory area in response to a corresponding one of said microinstructions; and wherein said correction means comprises source address correcting means for having said microinstruction executing means execute said specific microinstruction so that said address of the source memory area obtained when said predetermined event occurs is changed to a corrected source memory address which corresponds to a source memory area used in the immediately previous pipeline process.

3. A data processing apparatus as claimed in claim 1, further comprising data memory means for storing data;

wherein said parameter includes an address of a destination memory area in said memory means, and data is written into said destination memory area in response to a corresponding one of said microinstructions; and wherein said correction means comprises destination address correcting means for having said microinstruction executing means execute said specific microinstruction so that said address of the destination memory area obtained when said predetermined event occur is changed to a corrected destination memory address which corresponds to a destination memory area used in the immediately previous pipeline process.

4. A data processing apparatus as claimed in claim 1, further comprising data memory means for storing data;

wherein said parameter includes number-of-times information showing a number of times that data is transferred from a source memory area in said data memory means to a destination memory area therein in response to a corresponding one of said microinstructions; and wherein said correction means comprises number-of-times information correcting means for having said microinstruction executing means execute said specific microinstruction so that said number-of-times information obtained when said predetermined event occurs is changed to corrected number-of-times information which corresponds to number-of-times information used in the immediately previous process.

5. A data processing apparatus as claimed in claim 1, wherein said predetermined event includes a request to execute an exception process directed to eliminating an error when said microinstruction executing means is executing said selected one of the microinstructions.

6. A data processing apparatus as claimed in claim 1, wherein said predetermined event includes an interrupt caused by an external device coupled to said data processing apparatus.

7. The data processing apparatus as claimed in claim 1, further comprising means for receiving the address of said specific microinstruction and an address of one of the microinstructions other than said specific microinstruction and selecting the address of said specific microinstruction when said predetermined event occurs, so that the specific instruction can be read from the memory means and executed by said microinstruction executing means.

8. A data processing apparatus comprising:

memory means for storing microinstructions including a specific microinstruction;

first microinstruction address generating means for generating an address of one of the microinstructions other than said specific microinstruction;

microinstruction executing means, coupled to said memory means, for executing one of said microinstructions by a pipeline process and for outputting an operation result, said executing means including register means for storing a parameter having a first value;

second microinstruction address generating means for generating an address of said specific microinstruction in said memory means when one of the microinstructions executed by said microinstruction executing means indicates that said specific microinstruction should be executed instead of a currently executed microinstruction if a predetermined event occurs;

selecting means for receiving the address of said specific microinstruction from the second microinstruction address generating means and the address of one of the microinstructions from the second microinstruction address generating means and for selecting the address of said specific microinstruction when said predetermined event occurs, wherein:

said microinstruction executing mean s executes the specific microinstruction so that said first value of said parameter is changed to a second, corrected value which should be replaced by said first value of said parameter used in an immediately previous pipeline process; and said microinstruction executing means executes said currently-executed microinstruction again using said second, corrected value of said parameter after said second, corrected value is obtained.

9. A data processing apparatus as claimed in claim 8, further comprising source address correcting means for causing said microinstruction executing means to execute said specific microinstruction so that an address of a source memory area obtained when said selecting means selects said specific address is changed to a corrected source memory address which corresponds to the address of a source memory area used in the immediately previous pipeline process.

10. A data processing apparatus as claimed in claim 9, further comprising memory management means, coupled to said microinstruction executing means and said memory means, for reading out data from said memory means by referring to said parameter and for writing data into said second means by referring to said parameter, and determining means for determining whether or not a predetermined event occurs while said memory management means is reading out data from said memory area and for outputting a control signal to said selecting means when said predetermined event occurs;

wherein said selecting means selects said specific address in response to said control signal.

11. A data processing apparatus as claimed in claim 8, wherein:

said parameter includes an address of a destination memory area in said memory means, and data is written into said destination memory area in response to a corresponding one of said microinstructions; and further comprising destination address correcting means for causing said microinstruction executing means to execute said specific microinstruction so that said address of the destination memory area obtained when said selecting means selects said specific address is changed to a corrected destination memory address which corresponds to the address of a destination memory area used in the immediately previous pipeline process.

12. A data processing apparatus as claimed in claim 11, further comprising memory management means, coupled to said microinstruction executing means and said memory means, for reading out data from said memory means by referring to said parameter and for writing data into said second means by referring to said parameter, and determining means for determining whether or not a predetermined event occurs while said memory management means is writing data into said destination memory area and for outputting a control signal to said selecting means when said predetermined event occurs;

wherein said selecting means selects said address of said specific microinstruction in response to said control signal.

13. A data processing apparatus as claimed in claim 8, wherein:

said parameter includes number-of-times information showing a number of times that data is transferred from a memory area in said memory means to a destination memory area therein in response to a corresponding one of said microinstructions; and said microinstruction executing means comprises number-of-times information correcting means for causing said microinstruction executing means to execute said specific microinstruction so that said number-of-times information obtained when said selecting means selects said address of said specific microinstruction is changed to corrected number-of-times information which corresponds to number-of-times information used in the immediately previous pipeline process.

14. A data processing apparatus as claimed in claim 13, wherein said number-of-times information correcting means comprises increment means for incrementing the number of times that data is transferred by 1.

15. A data processing apparatus as claimed in claim 13, further comprising determining means for determining whether or not a predetermined event occurs while said memory management means is reading out data from said memory area and for outputting a control signal to said selecting means when said predetermined event occurs;

wherein said selecting means selects said address of said specific microinstruction in response to said control signal.

16. A data processing apparatus as claimed in claim 8, wherein:

said parameter includes an address of a destination memory area in said memory means, and data is written into said destination memory area in response to a corresponding one of said microinstructions; and said parameter includes number-of-times information showing a number of times that data is transferred from a memory area in said memory means to a destination memory area therein in response to a corresponding one of said microinstructions; and further comprising correction means, wherein said correction means comprises:

address correcting means for causing said microinstruction executing means execute said specific microinstruction so that said address of the memory area obtained when said selecting means selects said specific address is changed to a corrected memory address which corresponds to the address of a memory area used in the immediately previous pipeline process;

destination address correcting means for causing said microinstruction executing means to execute said specific microinstruction so that said address of the destination memory area obtained when said selecting means selects said specific address is changed to a corrected destination memory address which corresponds to the address of a destination memory area used in the immediately previous pipeline process; and number-of-times information correcting means for causing said microinstruction executing means to execute said specific microinstruction so that said number-of-times information obtained when said selecting means selects said address of said specific microinstruction is changed to corrected number-of-times information which corresponds to number-of-times information used in the immediately previous pipeline process.

17. A data processing apparatus as claimed in claim 8, wherein said specific address is generated when a request to execute an exception process directed to eliminating an error occurs while said microinstruction executing means is executing said selected one of the microinstructions.

18. A data processing apparatus as claimed in claim 8, wherein said specific address is generated when an interrupt is generated by an external device coupled to said data processing apparatus while said microinstruction executing means is executing said selected one of the microinstructions.

19. A data processing apparatus as claimed in claim 8, wherein said microinstructions include an exception process microinstruction directed to eliminating an error which occurs while said microinstruction executing means is executing said selected one of the microinstructions, and wherein said means comprises means for causing said microinstruction executing means to execute said exception process microinstruction after said specific microinstruction is executed.

* * * * *